US011813638B2

(12) United States Patent
Zhou et al.

(10) Patent No.: US 11,813,638 B2
(45) Date of Patent: Nov. 14, 2023

(54) HEATING DEVICE FOR HOT MELT GLUE GUN

(71) Applicant: Fenghua Weilder Electric Appliance CO., LTD., Zhejiang (CN)

(72) Inventors: Haowei Zhou, Zhejiang (CN); Jidong Fan, Zhejiang (CN)

(73) Assignee: Ningbo Weilder Electric Appliance Co., Ltd.

( * ) Notice: Subject to any disclaimer, the term of this patent is extended or adjusted under 35 U.S.C. 154(b) by 1390 days.

(21) Appl. No.: 15/650,629

(22) Filed: Jul. 14, 2017

(65) Prior Publication Data
US 2018/0361421 A1   Dec. 20, 2018

(30) Foreign Application Priority Data
Jun. 16, 2017   (CN) .......................... 201710457247.X

(51) Int. Cl.
*B05C 17/005*   (2006.01)
*B29B 13/02*   (2006.01)

(52) U.S. Cl.
CPC ...... *B05C 17/00546* (2013.01); *B29B 13/022* (2013.01)

(58) Field of Classification Search
CPC .......... B05C 17/00546; B05C 17/0053; B29B 13/022; H05B 1/00; H05B 3/00; B67D 1/00
USPC ......... 99/233, 521, 530, 534, 535, 421, 422, 99/423, 424, 425, 426; 222/146.5, 146.1, 222/146.2
See application file for complete search history.

(56) References Cited

U.S. PATENT DOCUMENTS

| 1,667,618 | A | * | 4/1928 | Abbott | B23K 3/025 |
| | | | | | 228/54 |
| 1,744,720 | A | * | 1/1930 | Blackburn | B29C 65/18 |
| | | | | | 219/240 |
| 2,030,285 | A | * | 2/1936 | Dinyer | A61B 18/082 |
| | | | | | 219/239 |
| 2,679,223 | A | * | 5/1954 | Franklin | B23K 3/025 |
| | | | | | 75/247 |
| 2,689,901 | A | * | 9/1954 | Obolensky | B23K 3/0307 |
| | | | | | 219/230 |
| 2,751,484 | A | * | 6/1956 | Moon | B23K 3/0353 |
| | | | | | 219/239 |
| 3,141,087 | A | * | 7/1964 | Schoenwald | B23K 3/0323 |
| | | | | | 219/233 |

(Continued)

FOREIGN PATENT DOCUMENTS

EP   0423388 A1 * 10/1989 ............... H05B 3/42

*Primary Examiner* — Jimmy Chou

(57) ABSTRACT

The invention relates to a heating device for a hot melt glue gun, comprising a tip and a heating piece; the tip comprises a connecting portion, a tapered heating portion and a glue output portion which are connected in turn; the inner cavities of the connecting portion, the tapered heating portion and the glue output portion communicate with one another in turn; at least one straight wall parallel to the axis of the tapered heating portion is disposed on the outer wall of the tapered heating portion, and the inner wall of the heating piece fits tightly with the straight wall; the heating device for a hot melt glue gun has a rational structure and high accuracy, is conveniently assembled and tightly fitted, accelerates the melting of the glue rod, and enhances the utilization efficiency of the hot melt glue gun.

7 Claims, 2 Drawing Sheets

(56) References Cited

U.S. PATENT DOCUMENTS

| | | | | |
|---|---|---|---|---|
| 3,141,956 A * | 7/1964 | Schoenwald | B23K 3/0323 | 219/233 |
| 3,298,572 A * | 1/1967 | Newton | B05C 17/00526 | 222/146.5 |
| 3,315,350 A * | 4/1967 | Kent | B23K 3/025 | 205/149 |
| 3,358,897 A * | 12/1967 | Christensen | B23K 20/007 | 228/41 |
| D213,782 S * | 4/1969 | Knowles | D15/144 | |
| 3,584,190 A * | 6/1971 | Marcoux | B23K 3/0475 | 219/233 |
| 3,627,191 A * | 12/1971 | Hood, Jr. | B23K 3/08 | 228/19 |
| 3,646,577 A * | 2/1972 | Ernst | B23K 3/033 | 219/241 |
| 3,690,538 A * | 9/1972 | Gaiser | B23K 20/005 | 228/1.1 |
| 3,690,539 A * | 9/1972 | Geiger | B23K 1/018 | 228/20.5 |
| 3,743,142 A * | 7/1973 | Elliott | B05C 17/0053 | 222/146.5 |
| 3,744,921 A * | 7/1973 | Weller | B05C 17/00533 | 401/2 |
| 3,876,857 A * | 4/1975 | Dhillon | B23K 3/03 | 219/230 |
| 3,884,409 A * | 5/1975 | Kaufman | B23K 1/018 | 228/20.5 |
| 4,014,464 A * | 3/1977 | Newton | B05C 17/00546 | 222/146.5 |
| 4,032,046 A * | 6/1977 | Elliott | B05C 17/00536 | 222/146.5 |
| 4,050,890 A * | 9/1977 | Elliott | B05C 17/00546 | 432/210 |
| 4,059,204 A * | 11/1977 | Duncan | B05C 17/00536 | 222/146.5 |
| 4,176,273 A * | 11/1979 | Fujie | B29C 65/18 | 219/220 |
| 4,289,953 A * | 9/1981 | Scheu, Jr. | B23K 1/018 | 15/344 |
| 4,314,655 A * | 2/1982 | Leibhard | B05C 17/00526 | 222/146.5 |
| 4,358,030 A * | 11/1982 | Leibhard | B05C 17/00526 | 222/146.2 |
| 4,379,516 A * | 4/1983 | Barlogis | B05C 17/0053 | 222/146.5 |
| D271,741 S * | 12/1983 | Riccio | D8/30 | |
| 4,493,972 A * | 1/1985 | Steinel | B05C 17/00546 | 219/230 |
| 4,523,705 A * | 6/1985 | Belanger | B05C 17/0053 | 222/146.5 |
| 4,553,935 A * | 11/1985 | Ueno | A61C 13/0028 | 222/146.5 |
| 4,562,337 A * | 12/1985 | Lawrence | B23K 3/0646 | 219/239 |
| 4,621,748 A * | 11/1986 | Dziki | B05C 17/00533 | 219/230 |
| 4,639,155 A * | 1/1987 | Schuster | B05C 17/00546 | 222/146.1 |
| 4,664,296 A * | 5/1987 | Dziki | B05C 17/00533 | 219/230 |
| 4,701,587 A * | 10/1987 | Carter | B23K 3/0475 | 219/233 |
| 4,745,264 A * | 5/1988 | Carter | B23K 3/0475 | 219/229 |
| 4,776,490 A * | 10/1988 | Wingert | B05C 17/0053 | 222/146.5 |
| 4,778,097 A * | 10/1988 | Hauser | B23K 20/106 | 228/1.1 |
| 4,804,110 A * | 2/1989 | Sperry | B05C 17/00536 | 222/56 |
| 4,938,388 A * | 7/1990 | Yeh | B05C 17/00536 | 219/241 |
| 5,007,574 A * | 4/1991 | Carlomagno | B23K 1/018 | 219/236 |
| 5,026,188 A * | 6/1991 | Capodieci | B05C 17/0053 | 219/230 |
| 5,122,637 A * | 6/1992 | Bottorff | B23K 3/033 | 219/229 |
| 5,215,230 A * | 6/1993 | Lee | B05C 17/0053 | 222/146.2 |
| 5,217,154 A * | 6/1993 | Elwood | B23K 3/025 | 228/4.5 |
| 5,362,164 A * | 11/1994 | Wingert | B05C 17/00526 | 219/505 |
| 5,374,806 A * | 12/1994 | Chou | B29C 65/18 | 219/227 |
| 5,446,262 A * | 8/1995 | McCambridge | B23K 3/0315 | 219/229 |
| 5,451,224 A * | 9/1995 | Goble | A61B 18/14 | 219/233 |
| 5,462,206 A * | 10/1995 | Kwasie | B05C 17/0053 | 222/146.5 |
| 5,479,914 A * | 1/1996 | Tsai | B05C 17/0053 | 126/401 |
| 5,584,419 A * | 12/1996 | Lasko | B05C 17/00533 | 219/240 |
| 5,641,418 A * | 6/1997 | Chou | B29C 65/18 | 219/227 |
| 5,683,603 A * | 11/1997 | Fortune | B23K 3/026 | 219/229 |
| 5,688,421 A * | 11/1997 | Walton | B05C 17/00526 | 219/230 |
| 5,725,127 A * | 3/1998 | Steinel | B05C 17/00526 | 222/146.5 |
| 5,880,432 A * | 3/1999 | Radmacher | F23Q 7/001 | 123/145 A |
| 5,881,923 A * | 3/1999 | Bokros | B05C 17/0053 | 219/227 |
| 5,881,924 A * | 3/1999 | Bokros | B05C 17/00526 | 219/227 |
| 5,954,260 A * | 9/1999 | Orcutt | B23K 20/005 | 228/1.1 |
| 6,041,972 A * | 3/2000 | Maayeh | B05C 17/0053 | 219/247 |
| 6,062,185 A * | 5/2000 | Chiu | F23Q 7/001 | 123/145 A |
| 6,065,888 A * | 5/2000 | Maayeh | B05C 17/0053 | 222/146.2 |
| 6,084,212 A * | 7/2000 | Leigh | F23Q 7/001 | 123/145 A |
| 6,105,824 A * | 8/2000 | Singleton | B05C 17/0053 | 219/221 |
| 6,142,207 A * | 11/2000 | Richardot | H05B 3/42 | 219/229 |
| 6,230,936 B1 * | 5/2001 | Lasko | B05C 17/0053 | 219/426 |
| 6,457,889 B1 * | 10/2002 | Lin | B05C 17/0053 | 126/401 |
| 6,524,102 B2 * | 2/2003 | Davis | A61C 9/0006 | 222/146.5 |
| 6,527,143 B1 * | 3/2003 | Schomacker | B05C 17/00533 | 222/146.5 |
| 6,558,059 B1 * | 5/2003 | Hillinger | B05C 17/00536 | 222/146.2 |
| 6,652,175 B2 * | 11/2003 | Chang | B05C 17/0053 | 219/229 |
| 6,727,473 B2 * | 4/2004 | Taniguchi | F23Q 7/001 | 123/145 A |
| 6,747,251 B1 * | 6/2004 | Belanger | B05C 17/00546 | 219/424 |
| 6,794,609 B2 * | 9/2004 | Mart | G06F 3/03545 | 219/201 |
| 6,838,642 B2 * | 1/2005 | Richardot | B05C 17/00546 | 219/229 |
| 7,367,474 B2 * | 5/2008 | Lin | B05C 17/00526 | 126/401 |
| 7,520,408 B1 * | 4/2009 | Smith | B05C 17/0053 | 219/200 |

(56) References Cited

U.S. PATENT DOCUMENTS

| | | | | |
|---|---|---|---|---|
| 7,608,805 B2* | 10/2009 | Miyazaki | ............ | B23K 3/0323 |
| | | | | 219/227 |
| 7,679,032 B2* | 3/2010 | Masaki | ................ | B23K 3/033 |
| | | | | 219/229 |
| 9,074,574 B2* | 7/2015 | Hammer | ................ | F02P 19/02 |
| D753,739 S * | 4/2016 | Bell | ............................ | D15/144 |
| 9,586,229 B1* | 3/2017 | Lee | .................... | B05C 17/0053 |
| 10,172,690 B1* | 1/2019 | Friedman | ................ | A61C 5/62 |
| 2003/0015512 A1* | 1/2003 | Sakamoto | ............. | B23K 3/033 |
| | | | | 219/229 |
| 2003/0205566 A1* | 11/2003 | Evanyk | ............. | B05C 17/0053 |
| | | | | 219/221 |
| 2003/0218006 A1* | 11/2003 | Sutorius | ............. | B29C 45/2737 |
| | | | | 219/535 |
| 2004/0232132 A1* | 11/2004 | Masaki | ................ | B23K 3/033 |
| | | | | 219/229 |
| 2006/0081650 A1* | 4/2006 | Axinte | ............. | B05C 17/00526 |
| | | | | 222/146.2 |
| 2006/0144859 A1* | 7/2006 | Lin | .................. | B05C 17/00526 |
| | | | | 222/146.6 |
| 2007/0114241 A1* | 5/2007 | Lin | .................. | B05C 17/00526 |
| | | | | 222/113 |
| 2009/0014439 A1* | 1/2009 | Kim | .................... | B29C 45/2737 |
| | | | | 219/634 |
| 2009/0220686 A1* | 9/2009 | Minion | ................ | B05B 7/0807 |
| | | | | 427/207.1 |
| 2011/0061444 A1* | 3/2011 | Suzuki | .................. | B23K 35/30 |
| | | | | 73/25.01 |
| 2013/0075385 A1* | 3/2013 | Rosen | .................... | B43L 19/00 |
| | | | | 219/233 |
| 2017/0080449 A1* | 3/2017 | Lee | .................... | B05C 17/0053 |
| 2017/0128158 A1* | 5/2017 | Jung | ........................ | A61C 5/55 |
| 2019/0224710 A1* | 7/2019 | Eichenhofer | ....... | B05C 17/0053 |

* cited by examiner

HEATING DEVICE FOR HOT MELT GLUE GUN

BACKGROUND OF THE INVENTION

Technical Field

The invention relates to the technical field of heating devices, in particular to a heating device for a hot melt glue gun.

Description of Related Art

Hot melt glue guns are a kind of decoration tool used for material coating, with the features of an accurate switching effect, various spray nozzles, capable of meeting the requirements of different production lines, unique filter screen design, and convenience in washing. The tip of a heating device for a hot melt glue gun includes a connecting portion, a heating portion and a glue output portion which are fixed in turn. The heating portions in the heating devices of the hot melt glue guns currently available on the market are tapered, and ceramic heating pieces are also tapered to correspond to the heating portions and are positioned on the outer circumferences of the heating portions. Thus, glue rods have end portions relatively far away from the tapered walls of the tapered heating portions and melt slowly, and it is difficult to control the accuracy of the tapered ceramic heating pieces, causing inconvenience to assembly between the ceramic heating pieces and the heating portions, resulting in a loose fit, and reducing the utilization efficiency of the hot melt glue guns.

BRIEF SUMMARY OF THE INVENTION

The objective of the invention is to provide a heating device for a hot melt glue gun to overcome the defects and shortcomings in the prior art. The heating device for a hot melt glue gun has a rational structure and high accuracy, is conveniently assembled and tightly fitted, accelerates the melting of the glue rods, and enhances the utilization efficiency of the hot melt glue gun.

To achieve the above objective, the invention adopts the following technical solution:

A heating device for a hot melt glue gun of the invention includes a tip and a heating piece, wherein the tip includes a connecting portion, a tapered heating portion and a glue output portion which are connected in turn; the inner cavities of the connecting portion, the tapered heating portion and the glue output portion communicate with one another in turn; at least one straight wall parallel to the axis of the tapered heating portion, and the inner wall of the heating piece fits tightly with the straight wall.

Further, the heating device also includes an insulating jacket which is wrapped on the outer circumference of the tapered heating portion, and the heating piece is fixed between the insulating jacket and the tapered heating portion.

The tapered heating portion comprises two straight walls.

The two straight walls are disposed opposite to each other.

The quantity of the heating piece corresponds to the quantity of the straight wall.

The end face of one end of the connecting portion close to the tapered heating portion fits tightly with the end portion of the heating piece.

The insulating jacket includes a first half insulating jacket and a second half insulating jacket; and the first half insulating jacket and the second half insulating jacket are fastened to each other.

The heating piece is a ceramic heating piece.

The invention has the following beneficial effects: at least one straight wall parallel to the axis of the tapered heating portion, and the heating piece fits tightly with the straight wall. Due to the arrangement of the straight wall on the outer circumference of the tapered heating portion, the distance between the heating piece and the end portion of the glue rod is shortened and the melting of the glue rod is accelerated. The heating piece is shaped as a plane matched with the straight wall, so the accuracy is high, the assembling is convenient, the fit is tighter, and the utilization efficiency of the hot melt glue gun is enhanced. The heating device for a hot melt glue gun of the invention has a rational structure and high accuracy, is conveniently assembled and tightly fitted, accelerates the melting of the glue rod, and enhances the utilization efficiency of the hot melt glue gun.

As shown in the figures: 1. Tip; 2. Heating piece; 3. Insulating jacket; 4. Glue output portion; 5. Connecting portion; 6. Tapered heating portion; 7. Straight wall; 8. First half insulating jacket; 9. Second half insulating jacket.

DETAILED DESCRIPTION OF THE INVENTION

The invention is further described below in conjunction with the attached drawings.

Embodiment 1

Figure 1:
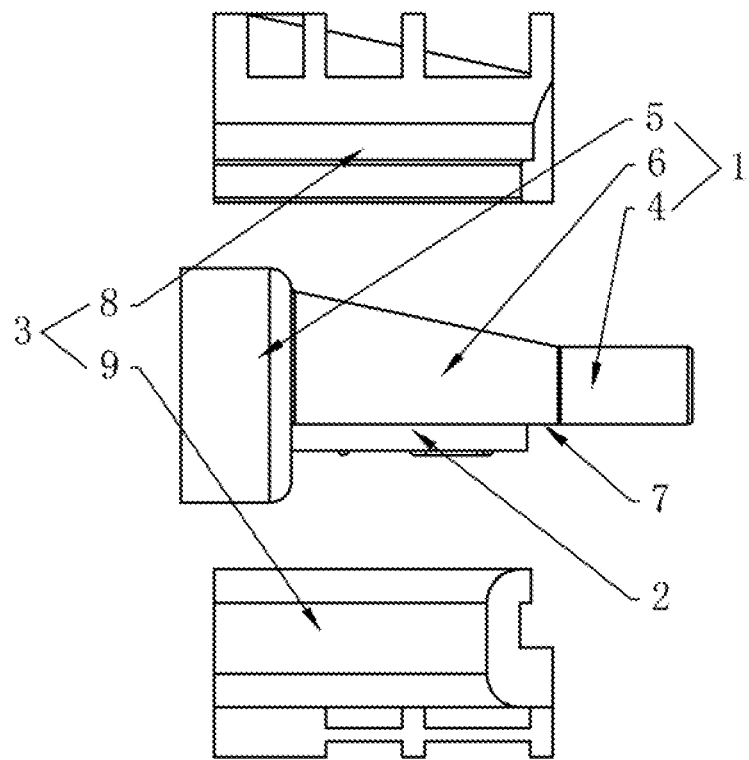
FIG. 1 is a schematic view of an overall structure of an embodiment of the invention.
Figure 2:
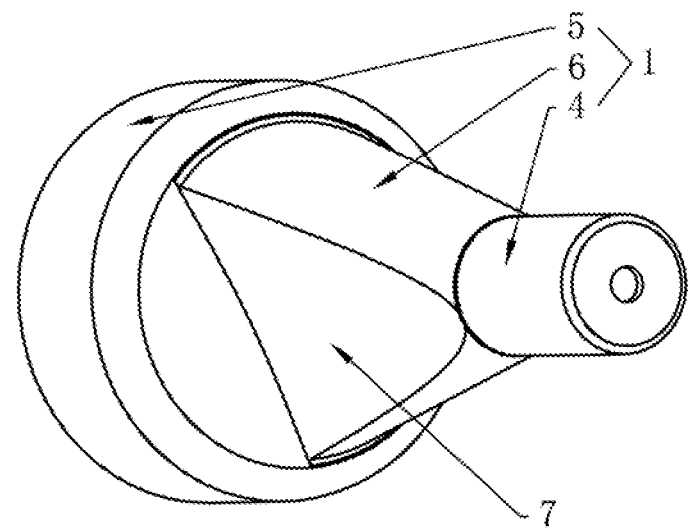
FIG. 2 is a schematic view of an overall structure of the tip in FIG. 1 of the invention.

As shown in FIG. 1 and FIG. 2, the heating device for a hot melt glue gun of the invention includes a tip 1 and a heating piece 2, wherein the tip 1 includes a connecting portion 5, a tapered heating portion 6 and a glue output portion 4 which are connected in turn; the inner cavities of the connecting portion 5, the tapered heating portion 6 and the glue output portion 4 communicate with one another in turn; at least one straight wall 7 parallel to the axis of the tapered heating portion 6 is disposed on the outer wall of the tapered heating portion 6, and the inner wall of the heating piece 2 fits tightly with the straight wall 7. Due to the arrangement of the straight wall on the outer circumference of the tapered heating portion 6, the distance between the heating piece 2 and the end portion of the glue rod is shortened and the melting of the glue rod is accelerated. The heating piece 2 is shaped as a plane matched with the straight wall 7, so the accuracy is high, the assembling is convenient, the fit is tighter, and the utilization efficiency of the hot melt glue gun is enhanced.

The heating device also includes an insulating jacket 3 which is wrapped on the outer circumference of the tapered heating portion 6, and the heating piece 2 is fixed between the insulating jacket 3 and the tapered heating portion 6 to play the role of heat insulation and temperature preservation.

The end face of one end of the connecting portion 5 close to the tapered heating portion 6 fits tightly with the end portion of the heating piece 2, so the melting of the end portion of the glue rod increases, further enhancing the utilization efficiency of the hot melt glue gun.

The insulating jacket 3 includes a first half insulating jacket 8 and a second half insulating jacket 9, and the first half insulating jacket 8 and the second half insulating jacket 9 are fastened to each other. The insulating jacket 3 is conveniently assembled and dismantled, and tightly wraps the tapered heating portion 6 and the heating piece 2.

The heating piece 2 is a ceramic heating piece, with a good heating effect.

Figure 3:
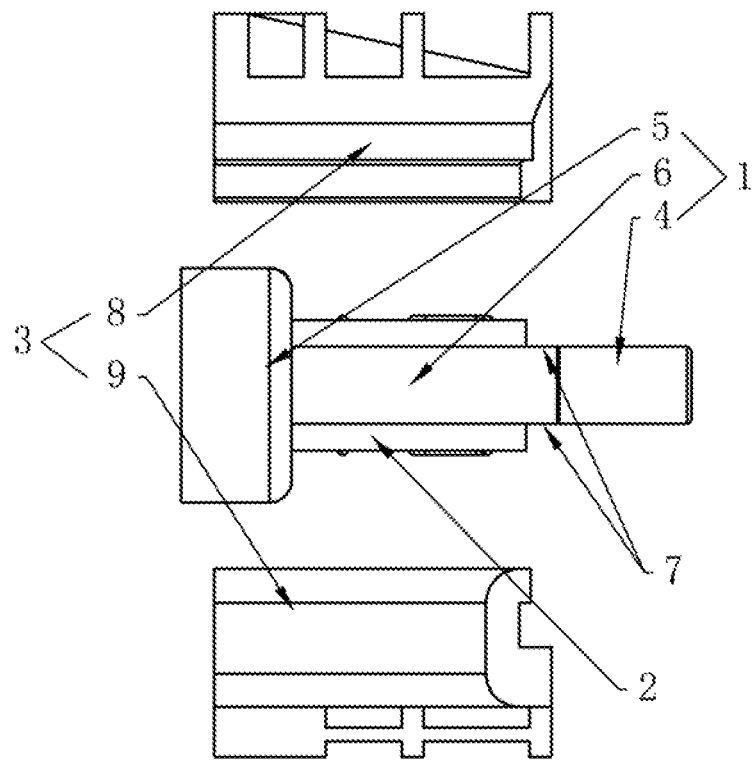
FIG. 3 is a schematic view of an overall structure of another embodiment of the invention.
Figure 4:
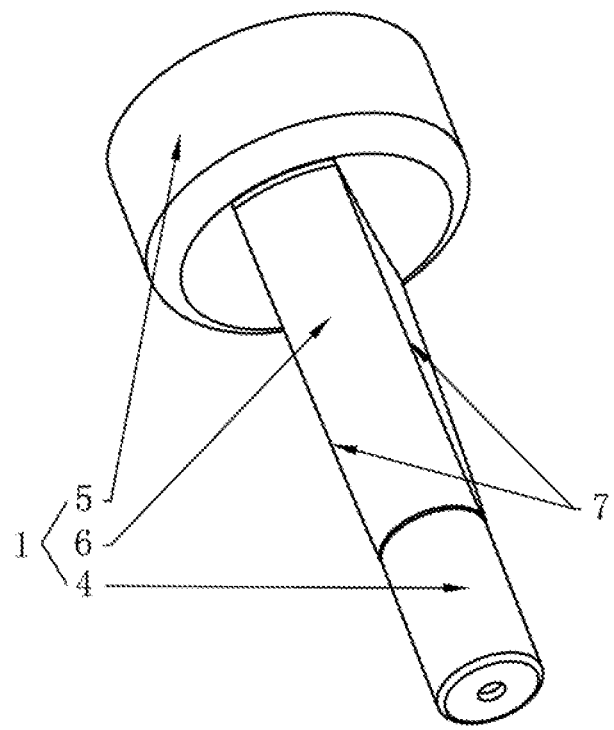
FIG. 4 is a schematic view of an overall structure of the tip in FIG. 3 of the invention.

As shown in FIG. 3 and FIG. 4, Embodiment 2 is identical with Embodiment 1 in the main structure, but different in that the tapered heating portion 6 comprises two straight walls 7 are. The two straight walls 7 are opposite to each other, and the quantity of the heating piece 2 corresponds to the quantity of the straight wall 7. In this way, the contact area between the heating piece 2 and the end face of the connecting portion 5 and between the heating piece 2 and the straight walls 7 is increased; the melting speed of the end portion of the glue rod is further enhanced; and the utilization efficiency of the hot melt glue gun is higher.

The above embodiments are merely preferably embodiments of the invention. Therefore, equivalent variations or modifications made on the basis of the structure, characteristics and principle in the scope of the patent application of the invention shall fall within the application scope of the invention.

What is claimed is:

1. A heating device for a hot melt glue gun, comprising: a tip and at least one heating piece, the tip comprising a circular-disk shaped connecting portion capable of being attached to a glue gun, a tapered heating portion and a circular-shaped glue output portion which are connected in turn, wherein the glue output portion is disposed on one end of the tapered heating portion and the connecting portion is disposed on the other end of the tapered heating portion, wherein the center of the connecting portion and the center of the glue output portion are concentric,
wherein outer walls of the tapered heating portion comprises at least one straight wall perpendicular to a top surface of the connecting portion and parallel to the axis of the tapered heating portion, wherein the at least one heating piece is disposed on the at least one straight wall;
wherein the heating device further comprising an insulating jacket which is wrapped on an outer circumference of the tapered heating portion, wherein the at least one heating piece is fixed between the insulating jacket and the tapered heating portion.

2. The heating device for a hot melt glue gun according to claim 1, further comprising two straight walls on the outer circumference of the tapered heating portion, wherein the two straight walls are parallel to each other.

3. The heating device for a hot melt glue gun according to claim 2, wherein the two straight walls are disposed opposite to each other.

4. The heating device for a hot melt glue gun according to claim 1, wherein there is one heating piece on each straight wall.

5. The heating device for a hot melt glue gun according to claim 1, wherein an end face of one end of the connecting portion close to the tapered heating portion fits tightly with the end portion of the at least one heating piece.

6. The heating device for a hot melt glue gun according to claim 1, wherein the insulating jacket comprises a first half insulating jacket and a second half insulating jacket; and the first half insulating jacket and the second half insulating jacket are fastened to each other.

7. The heating device for a hot melt glue gun according to claim 1, wherein the at least one heating piece is a ceramic heating piece.

\* \* \* \* \*